United States Patent
Chen

(10) Patent No.: US 9,560,719 B2
(45) Date of Patent: *Jan. 31, 2017

(54) LED SECURITY LIGHT AND LED SECURITY LIGHT CONTROL DEVICE THEREOF

(71) Applicant: Chia-Teh Chen, Taipei (TW)

(72) Inventor: Chia-Teh Chen, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,602

(22) Filed: Mar. 17, 2016

(65) Prior Publication Data

US 2016/0198546 A1  Jul. 7, 2016

Related U.S. Application Data

(63) Continuation of application No. 14/487,334, filed on Sep. 16, 2014, now Pat. No. 9,326,362, which is a continuation-in-part of application No. 13/222,090, filed on Aug. 31, 2011, now Pat. No. 8,866,392.

(51) Int. Cl.

| | | |
|---|---|---|
| *H05B 37/02* | (2006.01) | |
| *H05B 33/08* | (2006.01) | |
| *G08B 15/00* | (2006.01) | |
| *G08B 13/189* | (2006.01) | |

(52) U.S. Cl.
CPC ........ *H05B 37/0218* (2013.01); *G08B 15/00* (2013.01); *H05B 33/0815* (2013.01); *H05B 33/0818* (2013.01); *H05B 33/0824* (2013.01); *H05B 33/0827* (2013.01); *H05B 33/0854* (2013.01); *H05B 33/0872* (2013.01); *H05B 37/0227* (2013.01); *H05B 37/0272* (2013.01); *H05B 37/0281* (2013.01); *G08B 13/189* (2013.01); *Y02B 20/346* (2013.01); *Y02B 20/40* (2013.01); *Y02B 20/42* (2013.01); *Y02B 20/44* (2013.01); *Y02B 20/46* (2013.01)

(58) Field of Classification Search
CPC ............ H05B 33/0854; H05B 33/0815; H05B 37/0245
USPC ........ 315/149, 150, 152, 153, 291, 308, 360; 340/541, 565
See application file for complete search history.

(56) References Cited

U.S. PATENT DOCUMENTS

| | | | |
|---|---|---|---|
| 5,309,145 A * | 5/1994 | Branch | G08B 19/005 340/540 |
| 5,442,177 A | 8/1995 | Boulos et al. | |
| 5,598,066 A | 1/1997 | Wiesemann et al. | |
| 5,747,937 A | 5/1998 | Wiesemann et al. | |
| 6,225,748 B1 | 5/2001 | Evans et al. | |
| 6,586,890 B2 | 7/2003 | Min et al. | |
| 6,820,998 B2 | 11/2004 | Chen | |
| 6,888,323 B1 | 5/2005 | Null et al. | |
| 6,909,239 B2 | 6/2005 | Gauna | |
| 6,927,541 B2 | 8/2005 | Lee | |

(Continued)

*Primary Examiner* — Thuy Vinh Tran
(74) *Attorney, Agent, or Firm* — Rosenberg, Klein & Lee

(57) ABSTRACT

A two-level LED security light includes a power supply unit, a motion sensor unit, a time setting unit, a loading and power control unit, an external control unit, and a lighting-emitting unit. The LED security light is turned on at dusk for generating a first level illumination and turned off at dawn. When the motion sensor detects any intrusion, the LED security light is switched from the first level illumination to a second level illumination for a short duration time to scare away the intruder. After the short duration time, the LED security light returns to the first level illumination for saving energy. The light emitting unit includes one or a plurality of LEDs. The time setting unit is for managing illumination timing. The external control unit is for setting illumination characteristics of the first level illumination or the second level illumination of the light emitting unit.

62 Claims, 7 Drawing Sheets

(56) References Cited

U.S. PATENT DOCUMENTS

| | | |
|---|---|---|
| 7,086,756 B2 | 8/2006 | Maxik |
| 7,122,976 B1 | 10/2006 | Null et al. |
| 7,268,497 B2 | 9/2007 | Hsieh |
| 7,296,913 B2 | 11/2007 | Catalano et al. |
| 7,327,254 B2 | 2/2008 | Chen |
| 7,344,275 B2 | 3/2008 | Allen et al. |
| 7,405,524 B2 | 7/2008 | Null et al. |
| 7,450,095 B2 | 11/2008 | Yu et al. |
| 7,564,198 B2 | 7/2009 | Yamamoto et al. |
| 7,804,252 B2 | 9/2010 | Chen |
| 7,956,526 B2 | 6/2011 | Chen et al. |
| 8,035,513 B2 | 10/2011 | Raper |
| 8,123,379 B2 | 2/2012 | Chen |
| 8,310,163 B2 | 11/2012 | Chen |
| 8,598,805 B2 | 12/2013 | Tremblay et al. |
| 8,901,825 B2 * | 12/2014 | Reed ................ H05B 37/0281 315/149 |
| 9,089,016 B2 * | 7/2015 | Recker .................... H02J 9/02 |
| 2004/0066142 A1 | 4/2004 | Stimac et al. |
| 2006/0022916 A1 | 2/2006 | Aiello |
| 2007/0182338 A1 | 8/2007 | Shteynberg et al. |
| 2007/0182347 A1 | 8/2007 | Shteynberg et al. |
| 2008/0258647 A1 | 10/2008 | Scianna |
| 2009/0160369 A1 | 6/2009 | Godbole et al. |
| 2010/0097009 A1 * | 4/2010 | Lin .................. H05B 33/0854 315/297 |
| 2015/0084520 A1 * | 3/2015 | Reed ................ H05B 37/0281 315/152 |
| 2015/0282275 A1 * | 10/2015 | Felty ................ H05B 37/0218 315/152 |

\* cited by examiner

LED SECURITY LIGHT AND LED SECURITY LIGHT CONTROL DEVICE THEREOF

CROSS-REFERENCE TO RELATED APPLICATIONS

This application is a continuation of Non-provisional application Ser. No. 14/487,334 filed on Sep. 16, 2014, which is now U.S. Pat. No. 9,326,362. The U.S. Pat. No. 9,326,362 is a continuation-in-part of U.S. Pat. No. 8,866,392 filed on Aug. 31, 2011.

BACKGROUND

1. Technical Field

The present disclosure relates to a lighting apparatus, in particular, to a two-level security LED light with motion sensor

2. Description of Related Art

Lighting sources such as the fluorescent lamps, the incandescent lamps, the halogen lamps, and the light-emitting diodes (LED) are commonly found in lighting apparatuses for illumination purpose. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY

An exemplary embodiment of the present disclosure provides a two-level LED security light with motion sensor which may switch to a second level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in a first level illumination to save energy.

An exemplary embodiment of the present disclosure provides a two-level LED security light, comprising a light emitting unit, a loading and power control unit, a photo sensor unit, a motion sensor unit, a power supply unit, and an external control unit coupled with the loading and power control unit. The light emitting unit comprises at least one LED, or the light emitting unit is a LED lamp. The loading and power control unit comprises a microcontroller electrically coupled with a semiconductor switching device, wherein the semiconductor switching device is electrically connected in series with the power supply unit and the light emitting unit, wherein the microcontroller with program codes outputs a pulse width modulation (PWM) signal to a gate electrode of the semiconductor switching device to control the conduction period $T_{on}$ and the cut-off period $T_{off}$ of the semiconductor switching device for delivering different average electric currents from the power supply unit to drive the light emitting unit for generating different illuminations, wherein the microcontroller controls the semiconductor switching device respectively to have a first $T_{on}$ and a second $T_{on}$ of the conduction period such that the light emitting unit respectively generates a first level and a second level illumination characterized by light intensity and/or color temperature according to the received signal outputted from the photo sensor unit and the motion sensor unit, wherein the external control unit is for setting illumination characteristics of at least one of the first level illumination and the second level illumination of the light emitting unit.

Another exemplary embodiment of the present disclosure provides a two-level security light control device applicable to AC lighting sources, comprising a power supply unit, a photo sensor unit, a motion sensor unit, a loading and power control unit, a zero-crossing detection circuit, a phase controller, and an external control unit coupled with the loading and power control unit. The phase controller is in-series connected to an AC lighting source and an AC power source, wherein the loading and power control unit comprises a microcontroller for writing operation program to control a conduction period of the phase controller thereby to adjust the average power of the AC lighting source, wherein when an ambient light detected by the photo sensor unit is lower than a predetermined value, the AC lighting source is turned on by the loading and power control unit thereby to generate a first level illumination and when the ambient light detected by the photo sensor unit is higher than the predetermined value, the AC lighting source is turned off by the loading and power control unit; when an intrusion is detected by the motion sensor unit, the loading and power control unit changes the average power of the AC lighting source and a second level illumination is generated for a predetermined duration, wherein the first level and the second level illumination are characterized by specific light intensity and/or color temperature, wherein the external control unit is for setting illumination characteristics of at least one of the first level illumination and the second level illumination of the light emitting unit.

Another one exemplary embodiment of the present disclosure provides a two-level security light control device applicable to AC lighting sources, comprising a power supply unit, a photo sensor unit, a motion sensor unit, a loading and power control unit, a zero-crossing detection circuit, a plurality of phase controllers, and an external control unit coupled with the loading and power control unit. The plurality of phase controllers are respectively series-connected to a plurality of alternating current (AC) lighting sources, wherein the pairs of phase controller-AC lighting source are parallel-connected to an AC power source, wherein the loading and power control unit comprises a microcontroller for writing operation program to respectively control conduction periods of the phase controllers thereby to respectively adjust the average powers of the AC lighting sources, wherein when an ambient light detected by the photo sensor unit is lower than a predetermined value, the AC lighting sources are turned on by the loading and power control unit to generate a first level illumination for a predetermined duration and when the ambient light detected by the photo sensor unit is higher than the predetermined value, the AC lighting sources are turned off, wherein when an intrusion is detected by the motion sensor unit, the loading and power control unit changes the average power of the AC lighting sources to generate a second level illumination for a predetermined duration, wherein the first level and the second level illumination are characterized by specific light intensity and color temperature, wherein the external control unit is for setting the illumination characteristics of at least one of the first level illumination and the second level illumination of the AC lighting sources.

To sum up, a two-level LED security light with motion sensor provided by an exemplary embodiment in the present disclosure, may execute Photo-Control (PC) and Power-Saving (PS) modes. The PC mode may generate a second level (high level, for example) illumination for a predetermined duration then automatically switch to the PS mode by a control unit to generate a first level (low level, for example) illumination. When the motion sensor detects a human motion, the disclosed LED security light may immediate switch to the second level illumination for a short predetermined duration thereby achieve illumination or warning effect. After the short predetermined duration, the LED security light may automatically return to the first level illumination for saving energy. Further, the illumination characteristics of at least one of the first level illumination and the second level illumination of the light emitting unit can be set by the user by means of an external control unit.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
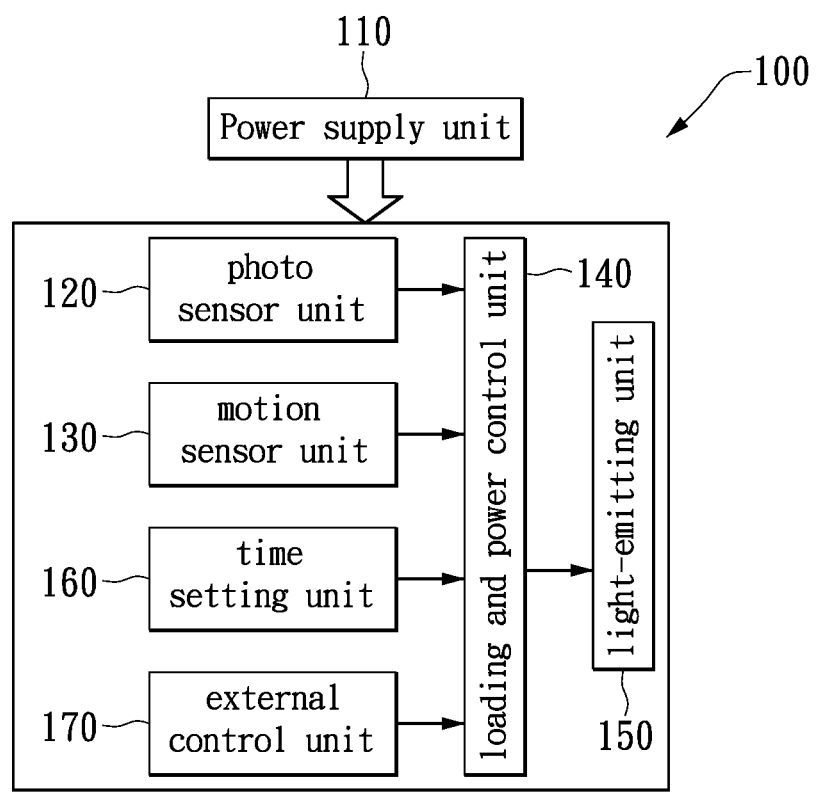
FIG. 1 schematically illustrates a block diagram of a two-level LED security light in accordance with an exemplary embodiment of the present disclosure.

Reference is made in detail to the exemplary embodiments of the present disclosure, examples of which are illustrated in the accompanying drawings. Wherever possible, the same reference numbers are used in the drawings and the description to refer to the same or alike parts.

(First Exemplary Embodiment)

Refer to FIG. 1, which schematically illustrates a block diagram of a two-level LED security light in accordance to the first exemplary embodiment of the present disclosure. A two-level LED security light (herein as the lighting apparatus) 100 includes a power supply unit 110, a photo sensor unit 120, a motion sensor unit 130, a loading and power control unit 140, a light emitting unit 150, a time setting unit 160 and an external control unit 170. The power supply unit 110 is used for supplying power required to operate the system, wherein the associated structure includes the known AC/DC power converter. The external control unit 170 is coupled with the loading and power control unit 140, wherein the external control unit 170 can be manipulated by the user for adjusting illumination characteristics of at least one of a first level illumination and a second level illumination of the light emitting unit 150. The first level and the second level illumination are characterized by light intensity and/or color temperature. For example, the first level illumination and the second level illumination may be a low level illumination (or no illumination) and a high level illumination respectively, but the present disclosure is not so restricted. In other embodiment, the first level illumination may be a first color temperature level illumination, and the second level illumination may be a second color temperature level illumination. The photo sensor unit 120 may be a photoresistor, which may be coupled to the loading and power control unit 140 for determining daytime or nighttime in accordance to the ambient light. The motion sensor unit 130 may be a passive infrared ray sensor (PIR) or microwave motion sensor, which is coupled to the loading and power control unit 140 and is used to detect intrusions. When a person is entering a predetermined detection zone of the motion sensor unit 130, a sensing signal thereof may be transmitted to the loading and power control unit 140.

The loading and power control unit 140 which is coupled to the light emitting unit 150 may be implemented by a microcontroller. The loading and power control unit 140 may control the illumination levels of the light emitting unit 150 in accordance to the sensing signal outputted by the photo sensor unit 120 and the motion sensor unit 130. The light emitting unit 150 may include a plurality of LEDs and switching components. The loading and power control unit 140 may control the light emitting unit 150 to generate at least two levels of illumination variations.

When the photo sensor unit 120 detects that the ambient light is lower than a predetermined value (i.e., nighttime), the loading and power control unit 140 executes the Photo-Control (PC) mode by turning on the light emitting unit 150 to generate a high level illumination for a predetermined duration then return to a low level illumination for Power-Saving (PS) mode. When the photo sensor unit 120 detects that the ambient light is higher than a predetermined value (i.e., dawn), the loading and power control unit 140 turns off the light emitting unit 150. In the PS mode, when the motion sensor unit 130 detects a human motion, the loading and power control unit 140 may increase the electric current which flows through the light emitting unit 150, to generate a high level illumination for a short predetermined duration. After the short predetermined duration, the loading and power control unit 140 may automatically reduce the electric current that flows through the light emitting unit 150 thus to have the light emitting unit 150 return to low level illumination for saving energy.

Figure 2A:
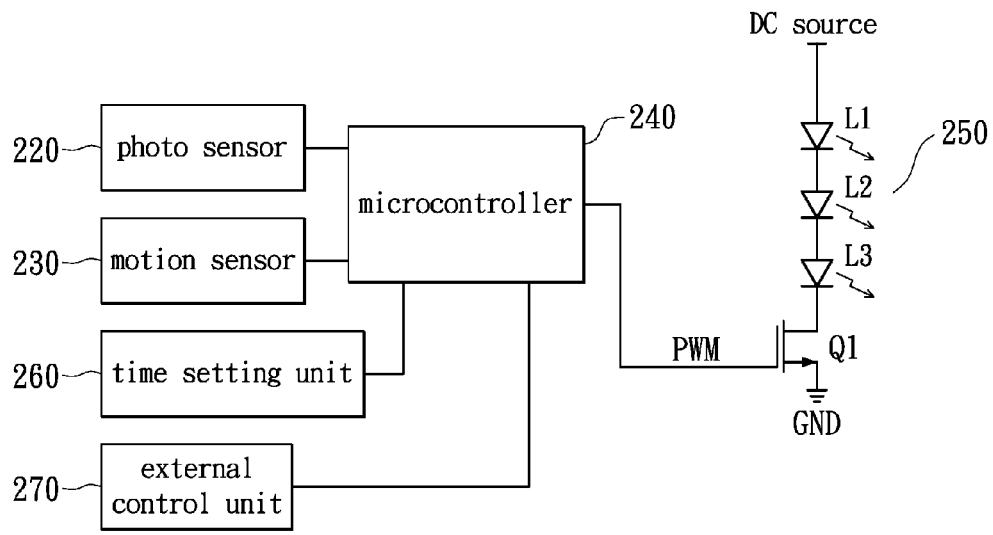
FIG. 2A illustrates a schematic diagram of a two-level LED security light in accordance to the first exemplary embodiment of the present disclosure.

Refer to FIG. 2A in view of FIG. 1, FIG. 2A illustrates a schematic diagram of a two-level LED security light in accordance to the first exemplary embodiment of the present disclosure. The photo sensor unit 120 may be implemented by a photo sensor 220; the motion sensor unit 130 may be implemented by a motion sensor 230; the loading and power control unit 140 may be implemented by a microcontroller 240; the time setting unit 260 is the time setting unit 160; and the external control unit 270 is the external control unit 170. The light emitting unit 250 includes three series-connected LEDs L1~L3. The LEDs L1~L3 is connected between a DC source and a transistor Q1, wherein an artisan of ordinary skill in the art will appreciate how to replace the transistor Q1 by other type of the semiconductor switching device. The DC source may be provided by the power supply unit 110. The transistor Q1 may be an N-channel metal-oxide-semiconductor field effect transistor (NMOS). The transistor Q1 is connected between the three series-connected LEDs L1~L3 and a ground GND. The loading and power control unit 140 implemented by the microcontroller 240 may output a pulse width modulation (PWM) signal to the gate of transistor Q1 to control the average electric current. It is worth to note that the electric components depicted in FIG. 2A only serves as an illustration for the exemplary embodiment of the present disclose and hence the present disclosure is not limited thereto. The external control unit 270 may be an electronic switch being optionally a push button, a touch panel or an infrared ray sensor for inputting voltage signal to adjust illumination characteristics of at least one of the first level illumination and the second level illumination of the light emitting unit. Further, in another embodiment, the external control unit 270 may be a push button, a touch panel, an infrared ray sensor or a wireless remote control device coupled or wirelessly linked to a pin of the microcontroller of the loading and power control unit; wherein, when the push button, the touch panel, the infrared ray sensor or the remote control device is activated, a voltage signal is generated to trigger the microcontroller 240 for performing at least one of the two functional modes, for instance the manual setting and the free-running setting (which would be explained thereafter) of the illumination characteristics. The external control unit 270 may be electrically coupled to the microcontroller 240 (that is the loading and power control unit 140), such as utilizing electrically connection through conducting wire. In other embodiment, the external control unit 270 may be a remote control device, thus the external control unit 270 is wirelessly linked to the microcontroller 240 by using wireless techniques.

In addition, the microcontroller 240 is coupled to a time setting unit 260, wherein the time setting unit 260 may allow the user to configure on software base a virtual timer embedded in the microcontroller 240 for executing a subroutine for a predetermined duration to perform the first level or the second level illumination respectively in the PC mode or in the PS mode. Further, if the microcontroller 240 is coupled to a clock device, the time setting unit 260 may allow the user to set a clock time point instead of a predetermined duration for switching from the PC mode to the PS mode. However, the present disclosure is not limited thereto.

Figure 2B:
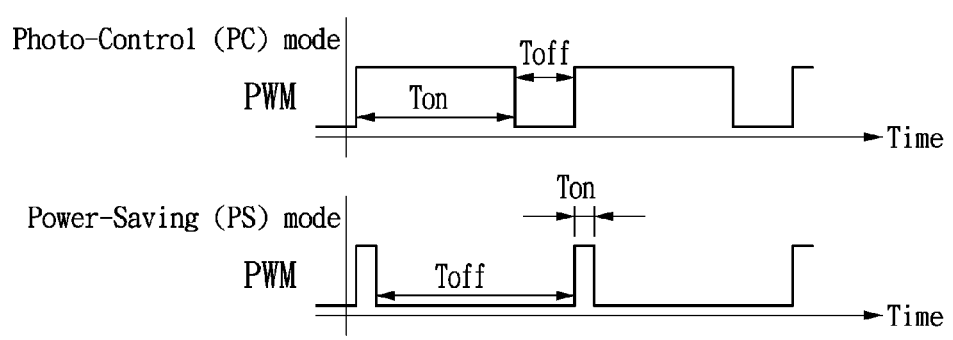
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light emitting unit 250 thereby generate high illumination, which may be classified as the high level illumination; whereas as the conduction period $T_{on}$ of transistor Q1 is shorter in the PS mode, therefore have lower average electric current driving the light emitting unit 250 thereby generate low illumination, which may be classified as the low level illumination.

The microcontroller 240 turns off the light emitting unit 250 during the day and activates the PC mode at night by turning on the light emitting unit 250 to generate the high level illumination for a short predetermined duration then return to the low level illumination thereby entering the PS mode. When the motion sensor 230 detects a human motion in the PS mode, the light emitting unit 250 may switch to the high level illumination for illumination or warning application. The light emitting unit 250 may return to the low level illumination after maintaining at the high level illumination for a short predetermined duration to save energy.

Please refer to FIG. 2A to further elucidate illumination level adjustment or setting. In order to adjust the illumination level of the light emitting unit 250, two exemplary control methods are applied by utilizing the external control unit 270. Specifically, the first exemplary method is a manual adjustment applicable when the loading and power control unit 240 executes the Power-Saving (PS) mode for generating a first level illumination. The first level illumination is preferred an illumination of low light intensity and/or low color temperature. Refer to FIG. 2A again, the microcontroller 240 may scan with its program codes a pin connected with the external control unit 270 and may detect control signal generated from the external control unit 270. The external control unit 270 may be preferable a push button. When the push button is pressed down by a user to ground the connecting pin of the microcontroller 270, a zero voltage is generated for a time duration until the push button is released, such that a control signal with a zero voltage of a time duration is generated manually by the user. The microcontroller 240 with program codes recognizes this control signal and by executing a subroutine generates a PWM signal with a conduction time period $T_{on}$ periodically varying within a preset range of 0 to 50% duty ($T_{on}$ is equal to $T_{off}$) for a time length controlled by the external control unit 270, such that the LEDs 250 generate illumination with light intensity level gradually and periodically increasing from zero to 50% of the maximum light intensity and then decreasing from 50% to zero to complete a repetitive cycle. The time length of such periodical illumination variation is equal to the time duration of zero voltage generated by pushing down the push button 270. Only when the push button 270 is released by the user, the periodical illumination variation is ended at a illumination level related to a specific $T_{on}$ value determined by the user; then the microcontroller 240 jumps out of the subroutine of periodical illumination variation and stores thereafter the corresponding $T_{on}$ value of the PWM signal in its memory to update a data base for generating a new first level illumination in the PS mode. In brief, by pressing down and releasing the push button 270 connected with a pin of the microcontroller 240, the illumination level of the light emitting unit 250 can be thus set manually by the user when the loading and power control unit 240 executes the PS mode. However, the present disclosure is not limited thereto.

The second exemplary method is a free-running setting by program codes of microcontroller in conjunction with the external control unit. Refer to FIG. 2A. When the lighting apparatus is turned on by the photo sensor 220, the microcontroller 240 starts its program codes by executing a subroutine in which PWM signal is generated with the conduction time period $T_{on}$ periodically varying within a preset range of 0 to 50% duty for a fixed time period, such that the LEDs 250 generate illumination with light intensity level gradually and periodically increasing from zero to 50% of the maximum light intensity and then decreasing from 50% to zero light intensity to complete a variation cycle. This periodical variation of the low illumination level can last freely for two or three cycles within the fixed time period which is preferable to be one minute. However, it is not to limit the present invention in this manner. Within the one-minute fixed time period, for instance, the periodical illumination variation may be ended by activating the external control unit 270. The external control unit 270 may be preferable a push button. When the push button is pressed down instantly by a user to ground the connecting pin of the microcontroller 270, a zero voltage is generated to trigger the microcontroller 240 wherein the microcontroller 240 jumps out of the subroutine to terminate the free-running illumination variation and stores the $T_{on}$ value of PWM signal corresponding to the time point when the external control unit 270 being activated. The stored $T_{on}$ value is used to update a data base for generating the first level illumination in the PS mode. The free-run of periodical illumination variation may automatically end when the one-minute fixed time period expires with the external control unit 270 not being operated by the user; in this case, the microcontroller 240 jumps out of the subroutine of free-run and acquires from its memory a preset or earlier $T_{on}$ value of PWM signal for generating the first level illumination in the PS mode until the lighting apparatus is turned off.

In brief, in a preferred embodiment of the present disclosure, a two-level LED security light may include a power supply unit, a photo sensor unit, a motion sensor unit, a loading and power control unit, a light emitting unit, a time setting unit and an external control unit. The external control unit is provided for adjusting or setting illumination level of LED light. The loading and power control unit is implemented by a microcontroller with program codes to operate the two-level LED security light. The microcontroller turns off the light emitting unit during the day and activates a Power-Saving (PS) mode at night by turning on the light emitting unit to generate a first level illumination, and upon human motion detection by switching the light emitting unit to generate a second level illumination for a short time duration. The illumination characteristics of first level illumination can be changed by activating the external control unit according to the user's demand. When the lighting apparatus is turned on, the microcontroller starts its program codes by firstly executing a subroutine with free-run for a fixed time length, such that the user can follow the gradual and periodical illumination variation to select an illumination level by operating the external control unit; thereafter, the microcontroller jumps out of the subroutine of free-run and executes the program codes of PS mode for generating the first level illumination with the selected level characteristics until the lighting apparatus is turned off. If within the fixed time length of free-run the external control unit is not activated, the microcontroller jumps out of the subroutine of free-run automatically and, with a data base of a preset or earlier level characteristics, executes program codes of PS mode for generating the first level illumination until the lighting apparatus is turned off. The level characteristics can also be further adjusted manually by the user when loading and power control unit executes the PS mode. The external control unit may be preferable a push button. When in PS mode the light emitting unit generates a first level illumination, the user can press the push button for a while to observe the gradual and periodical changing of level characteristic, and then decide at a time point to release the push button to select a desired illumination level, such that to complete manual adjustment.

Figure 2C:
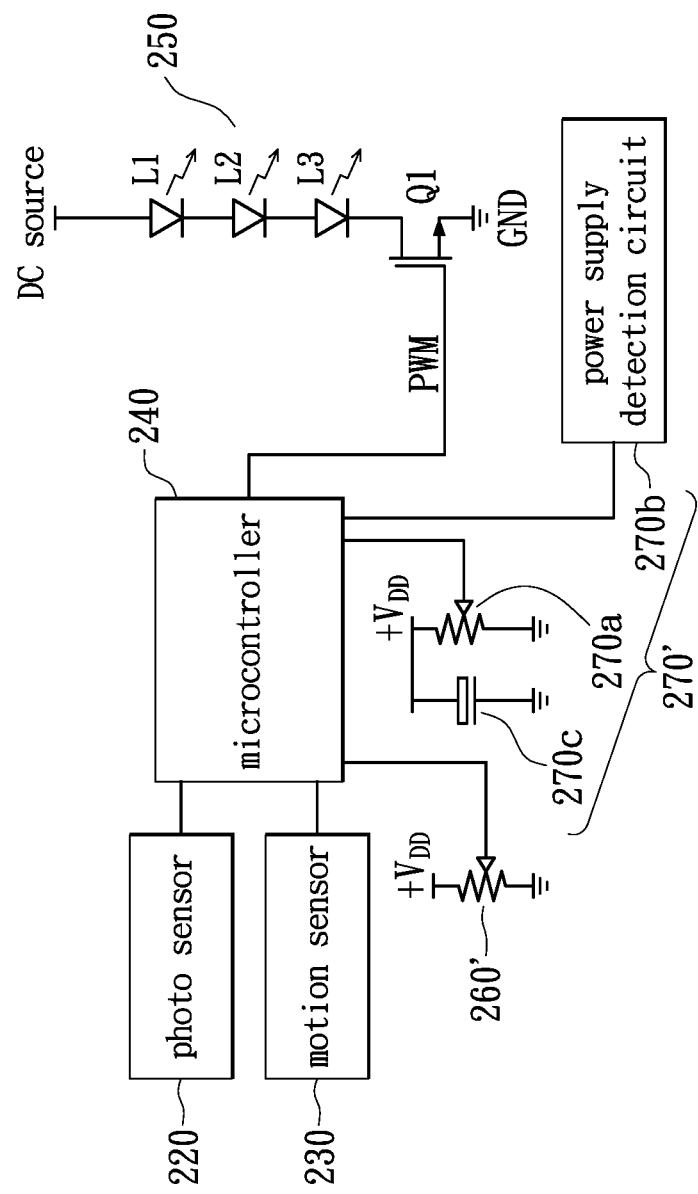
FIG. 2C illustrates in some detail a schematic diagram of a two-level LED security light of FIG. 2A.

Please refer to FIG. 2C in view of FIG. 2A and FIG. 2B. Two preferred constructions respectively for the time setting unit 260' and the external control unit 270' are shown in FIG. 2C. The time setting unit 260' may be a voltage divider with variable resistor for setting predetermined time durations for the first level and the second level illumination. The external control unit 270' may include a voltage divider 270a which may comprise a variable resistor provided with a rotating knob to facilitate operation. For illumination level setting, the microcontroller operates with program codes preferably in conjunction with the voltage divider 270a and further with a power supply detection circuit 270b, an energy storage capacitor 270c and a power switch (not shown in FIG. 2C) for respectively manual and free-running setting of at least one of a first level illumination and a second level illumination of the two-level LED security light; details of adjusting illumination level with the external control unit 270' and other extra devices will be described later.

In order to adjust the illumination level of the light emitting unit 250, two exemplary control methods are applied by utilizing the external control unit 270a and the software technique incorporating with extra devices 270b-270c. Specifically, the first exemplary method is a manual adjustment applicable in the Power-Saving (PS) mode for generating a first level illumination. Refer to FIG. 2C again, the microcontroller 240 may scan with its program codes the voltage on a pin connected with the voltage divider 270a and may detect a voltage, in which the voltage across of the variable resistor (voltage divider 270a) may be varied manually when a user rotates the knob attached on the variable resistor (voltage divider 270a). The microcontroller 240 with program codes generates in response a PWM signal with a conduction time period $T_{on}$ proportional to a voltage received from the variable resistor (voltage divider 270a). The light emitting unit 250 illuminates accordingly with light intensity level characterized by the conduction time period $T_{on}$ controlled by the voltage of the variable resistor (voltage divider 270a). With the external control unit 270', the first illumination level of the light emitting unit 250 can be thus set manually by tuning the variable resistor (voltage divider 270a) when the loading and power control unit 240 executes the PS mode.

The second exemplary method is a free-running adjustment based on program codes of microcontroller in conjunction with a power supply detection circuit and an energy-stored capacitor. Refer to FIG. 2C, when the lighting apparatus is turned on, the microcontroller 240 starts its program codes firstly by executing a subroutine of free-run in which PWM signal is generated with the conduction time period $T_{on}$ periodically varying within a preset range of 0 to 50% duty for a fixed time period, such that the LEDs 250 generate illumination with light intensity level gradually and periodically increasing from zero to 50% of the maximum light intensity and then decreasing from 50% to zero to complete a variation cycle. This periodical variation of the low illumination level can last freely for two or three cycles within the fixed time period which is preferable to be one minute. However, it is not to limit the present invention in this manner. Within the one-minute fixed time period, for instance, the free-run of periodical illumination variation may be overridden by the user by turning off a power switch momentarily (for 1-2 seconds) and then switching it back on. At the moment when the power switch is turned off and then switched back on, the microcontroller 240 detects this OFF-ON event through a power supply detection circuit 270b and leaves the subroutine to terminate free-run, and simultaneously stores the $T_{on}$ value of PWM signal related to the time point of the OFF-ON event to update a data base for generating the first level illumination in the PS mode. In general, the user can follow the gradual and periodical free-run of the low level lighting variation and select a favorable light intensity level by promptly turning the power switch off and again on (short power interruption). After overriding by power interruption, the microcontroller 240 jumps out of the subroutine of free-run and continues its program codes to execute the PS mode in which the illumination level is determined by the user. The free-run of periodical lighting variation may end automatically when the fixed time period expires with power interruption not being detected; the microcontroller 240 jumps out of the subroutine of free-run and acquires from its memory a preset or earlier $T_{on}$ value of PWM signal for generating the first level illumination in the PS mode. Refer to FIG. 2C again, an energy storage capacitor 270c is connected between the high end and the ground of the working voltage $V_{DD}$. This capacitor 270c is for holding the voltage $V_{DD}$ to keep the circuits 240, 270b still working when electric power is interrupted for 1-2 seconds. Therefore, when overriding free-run by short power interruption, an instant zero voltage is detected by the power supply detection circuit 270b and recognized by the microcontroller 240 to perform function for selecting and setting a desired illumination level.

In another embodiment, refer to FIG. 1 again, when an ambient light detected by the photo sensor unit 120 is lower than a predetermined value, the light emitting unit 150 may be turned on thereby by the loading and power control unit 140 to generate an adjustable level illumination for a first predetermined duration and then turned off or switched to a low level illumination, when an intrusion is detected by the motion sensor unit 130, the light emitting unit 150 is turned on by the loading and power control unit 140 to generate a high level illumination for a second predetermined duration and then turned off or switched to a low level illumination until the next intrusion detection; when an ambient light detected by the photo sensor unit 120 is higher than the predetermined value, the light emitting unit 150 is turned off by the loading and power control unit. The time setting unit 160 is used to set the first and the second predetermined duration respectively for the adjustable level illumination and the high level illumination. The external control unit 170 is used in two setting modes for setting illumination characteristics of the adjustable level illumination; wherein the first setting mode is a manual setting, in which the illumination level of the light emitting unit is set in a preset range by activating the external control unit; 170 wherein the second setting mode is a free-running setting, in which the light emitting unit performs a free-run of the adjustable level illumination with light intensity gradually and periodically increasing and then decreasing in a preset range to complete a cycle, wherein the free-run may be terminated by activation of the external control unit 170 at a time point corresponding to a specific light intensity level, such that the light emitting unit performs the adjustable level illumination constantly with the specific light intensity level being set thereof.

In still another embodiment, a lighting management device is provided. Refer to FIG. 1 again, the lighting management device applicable to a lighting load such as the light emitting unit 150. The lighting management device comprises the loading and power control unit 140, the power supply unit 110 and the external control unit 170 coupled with the loading and power control unit. The loading and power control unit 140 comprises a microcontroller (such as the microcontroller 240 shown in FIG. 2A) electrically coupled with a semiconductor switching device (such as the transistor Q1 shown in FIG. 2A). The external control unit 170 may be a push button, a touch panel, an infrared ray sensor or a remote control device coupled or wirelessly linked to a pin of the microcontroller. The semiconductor switching device is electrically connected in series with the power supply unit and the lighting load, such as the transistor Q1 is electrically connected in series with the DC source and the light emitting unit 250, wherein the microcontroller with written program code controls the conduction rate of the semiconductor switching device, wherein the external control unit 170 enables a user to select a desired illumination characteristic during a free running setting process performed by the lighting load, wherein the lighting load operates a free-run of illumination level by gradually and periodically changing the illumination characteristic, wherein the free-run may be terminated by activation of the external control unit 170 at a time point corresponding to a specific illumination characteristic selected by the user, wherein the microcontroller accordingly interprets the conduction rate of the semiconductor switching device at the time point when the external control unit 170 is activated and the free running is terminated to be the illumination characteristic set for illumination performance, the illumination characteristic is then memorized by the microcontroller for repetitive performance. Further, in one embodiment, the free run setting is terminated and the illumination characteristic of the lighting load is set by turning off a power switch instantly and turning it back on at the time point the lighting load performs a desired lighting characteristic selected by the user.

Figure 2D:
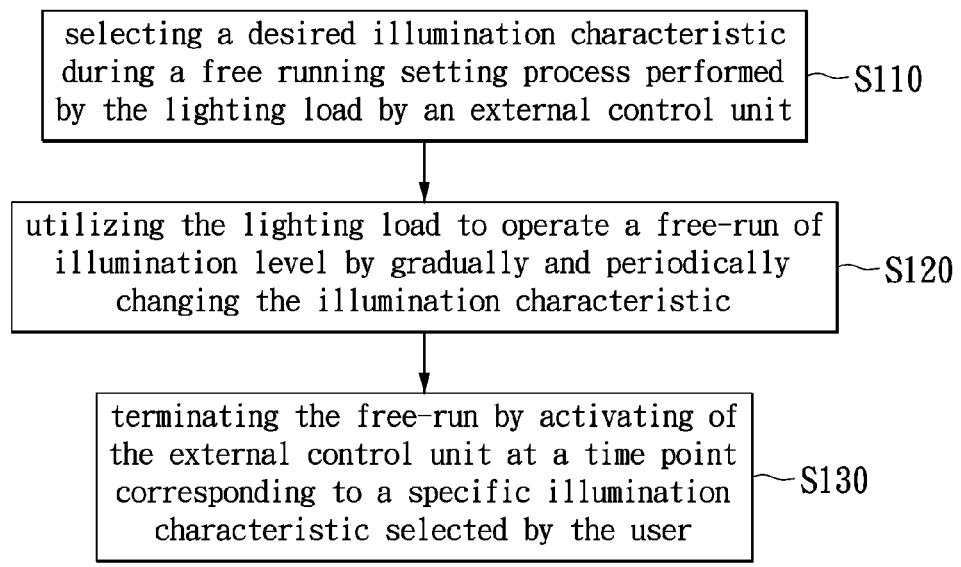
FIG. 2D illustrates a flow chart of a free running setting method in accordance to the first exemplary embodiment of the present disclosure.

According to the previous embodiment, a free running setting method with activation of external control unit or through power switch interruption is provided. Refer to FIG. 2D, the method comprises step S110: selecting a desired illumination characteristic during a free running setting process performed by the lighting load by an the external control unit; S120: utilizing the lighting load to operate a free-run of illumination level by gradually and periodically changing the illumination characteristic; and S130: terminating the free-run by activating of the external control unit or through power switch interruption at a time point corresponding to a specific illumination characteristic selected by the user, wherein the microcontroller accordingly interprets the conduction rate of the semiconductor switching device at the time point when the external control unit is activated or a power switch interruption is detected and the free running is terminated to be the illumination characteristic set for illumination performance, the illumination characteristic is then memorized by the microcontroller for repetitive performance.

In summary, in a preferred embodiment of the present disclosure, a two-level LED security light may employ an external control unit coupled to a loading and power control unit for adjusting or setting the illumination level of the LED light. The external control unit may be a push button, a voltage divider, a touch panel, an infrared ray sensor or other devices for generating control signals having different attributes depending on the category of the external control unit. For instance, a push button generates a binary signal having a zero voltage lasting for a time length equal to the time duration while the push button being pushed down; quite different, a voltage divider generates a DC voltage tuned by rotating a rotary knob attached to the voltage divider. The loading and power control unit may be implemented by a microcontroller with program codes designed respectively accommodating to different control signals of different attributes for generating PWM signal with $T_{on}$ value variable according to the control signal attribute, such as to carry out illumination level adjustment or setting. The illumination level characteristics including light intensity and color temperature can be thus set by operating the external control unit.

(Second Exemplary Embodiment)

Figure 3A:
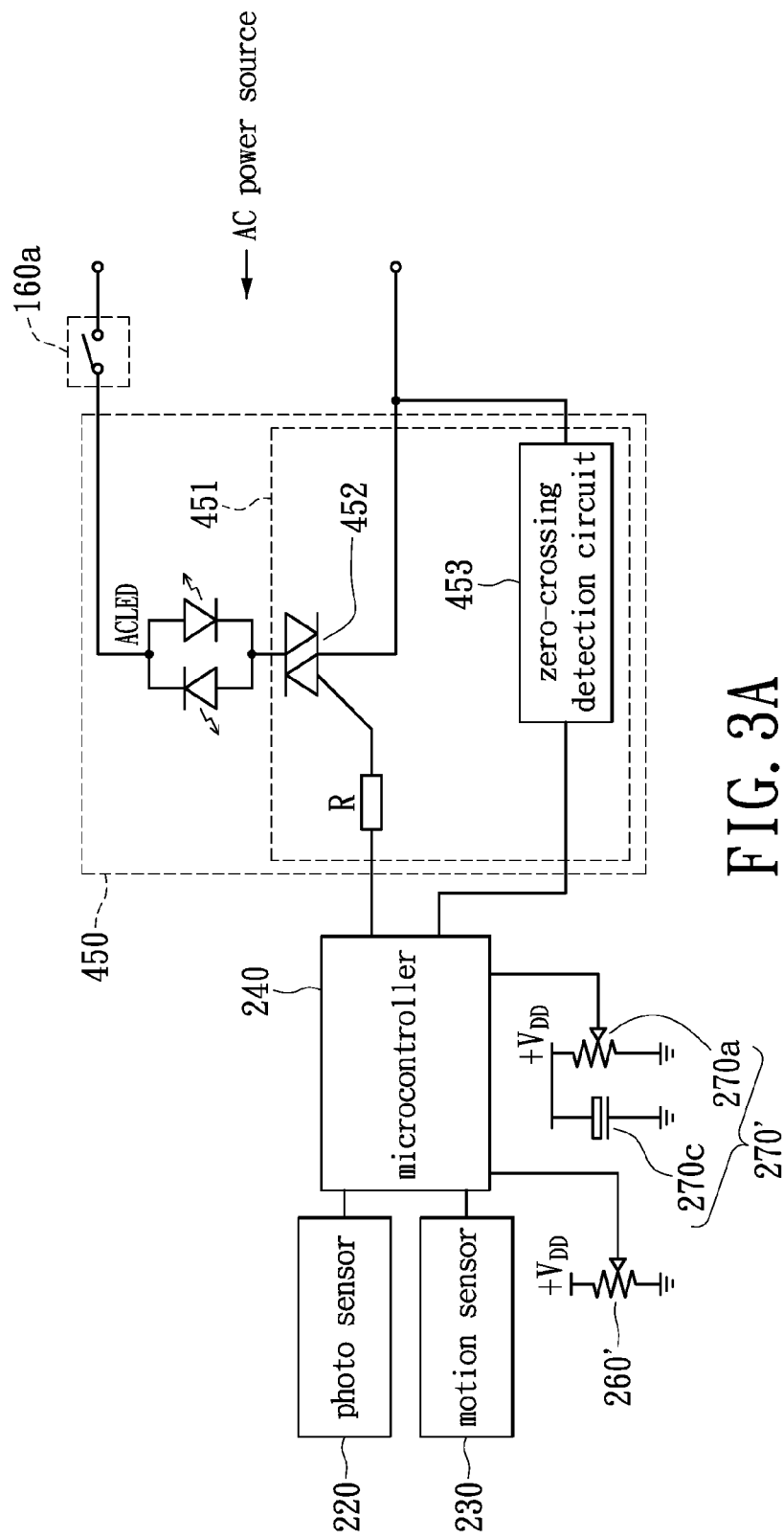
FIG. 3A illustrates a schematic diagram of a two-level LED security light in accordance to the second exemplary embodiment of the present disclosure.
Figure 4:
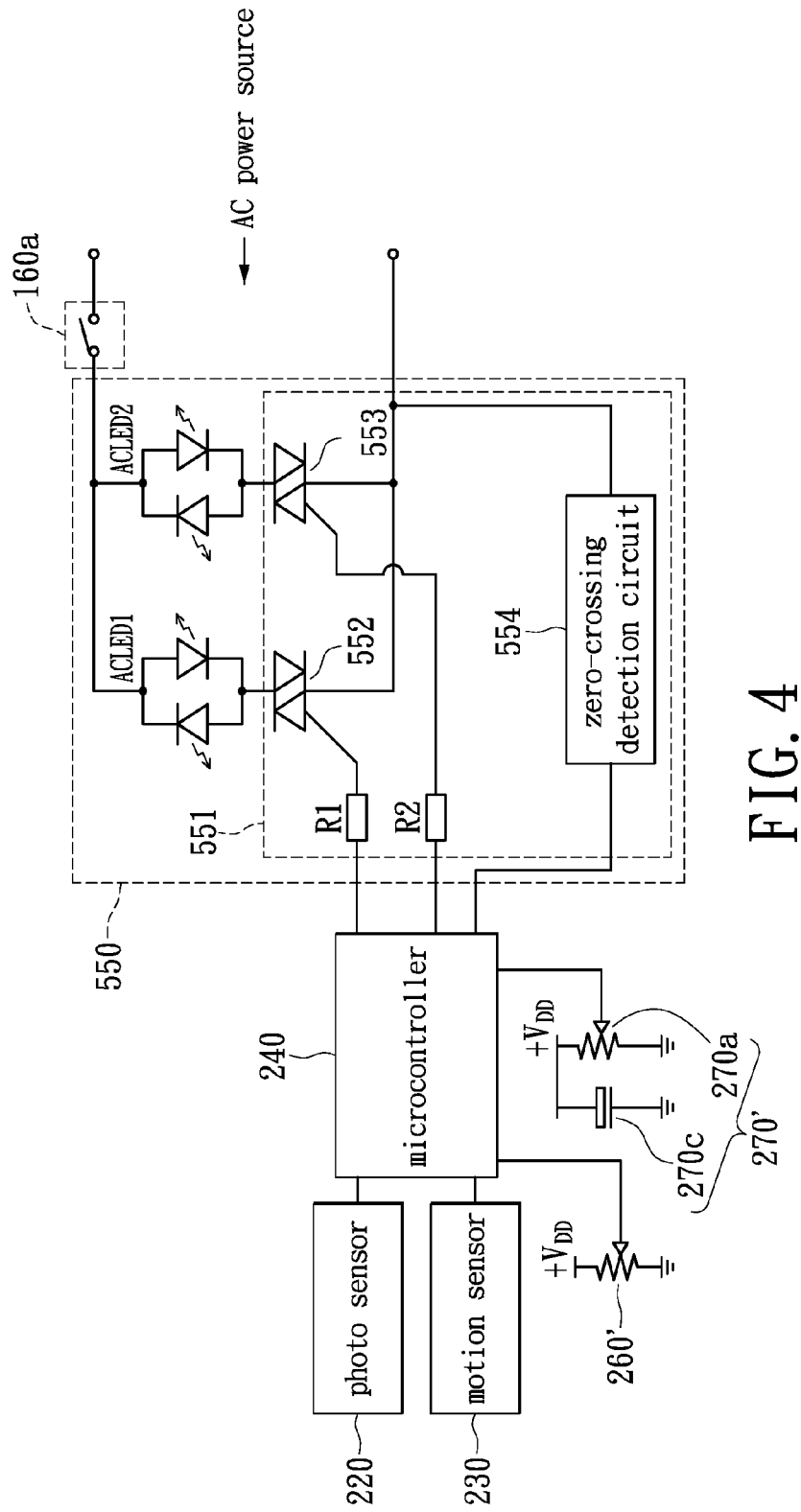
FIG. 4 illustrates a schematic diagram of a two-level LED security light in accordance to the second exemplary embodiment of the present disclosure.

Refer back to FIG. 1, wherein the light emitting unit 150 may include a phase controller and one or more parallel-connected alternating current (AC) LEDs. The phase controller is coupled between the described one or more parallel-connected ACLEDs and AC power source. The loading and power controller 140 in the instant exemplary embodiment may through the phase controller adjust the average power of the light emitting unit 150 so as to generate variations in the first level and the second level illuminations. Refer to FIG. 3A and FIG. 4 in conjunction with FIG. 1, this embodiment provides a two-level security light control device applicable to AC lighting sources, comprising the power supply unit 110, the photo sensor unit 120 (that is the photo sensor 220), the motion sensor unit 130 (that is the motion sensor 230), the loading and power control unit 140 (that is the microcontroller 240), a zero-crossing detection circuit 453, a plurality of phase controllers (one phase controller 452 shown in FIG. 3A and one phase controllers 551 shown in FIG. 4 are exemplary illustrated), the time setting unit 160 (that is the variable 260') and the external control unit 270' coupled with the loading and power control unit 240.

Refer to FIG. 3A, which illustrates a schematic diagram of a two-level LED security light 100 in accordance to the second exemplary embodiment of the present disclosure. The operation of the external control 270' can be referred to FIG. 2C and the related description of manual and free-running setting of illumination level, and the earlier description thus the redundant information is not repeated. It is worth mentioning that the power supply detection circuit 270b is implemented by the zero-crossing detection circuit 453, and the power switch mentioned in the previous embodiment can be implemented by the power switch 160a electrically coupled to the AC power source and the zero-crossing detection circuit 453. For a two-level LED security light setting up at the ceiling or a high site far from the user, the free-run setting of the illumination level through instant power interruption by utilizing the power switch 160a is very convenient for the user, in which no any added switching device is needed. The main difference between FIG. 3A and FIG. 2C is in that the light-source load is an ACLED, which is coupled to the AC power source, and further the light emitting unit 450 includes a phase controller 451, for ease of explanation, but the present disclosure is not so restricted. The phase controller 451 is in-series connected to the AC lighting source (ACLED) and the AC power source, wherein the microcontroller 240 is for writing operation program to control a conduction period of the phase controller 451 thereby to adjust the average power of the AC lighting source (ACLED). In another embodiment, a plurality of phase controller 451 can be also controlled by the microcontroller 240. The phase controller 451 includes a bi-directional switching device 452, here, a triac, a zero-crossing detection circuit 453, and a resistor R. The microcontroller 240 turns off the light emitting unit 450 when the photo sensor 220 detects that the ambient light is higher than a predetermined value. Conversely, when the photo sensor 220 detects that the ambient light is lower than the predetermined value, the microcontroller 240 activates the PC mode by turning on the light emitting unit 450. In the PC mode, the microcontroller 240 may select a control pin for outputting a pulse signal which through a resistor R triggers the triac 452 to have a large conduction angle. The large conduction angle configures the light emitting unit 450 to generate a high level illumination for a predetermined duration. Then the microcontroller 240 outputs the pulse signal for PS mode through the same control pin to trigger the triac 452 to have a small conduction angle for switching the light emitting unit 450 from the high level illumination to the low level illumination of the PS mode. Moreover, when the motion sensor 230 (also called motion sensor unit) detects a human motion in the PS mode, the microcontroller 240 temporarily outputs the PC-mode pulse signal through the same control pin to have the light emitting unit 450 generated the high level illumination for a short predetermined duration. After the short predetermined duration, the light emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2}f - t_o$ for a light-source load with a cut-in voltage $V_t$, wherein $t_o = (1/2\pi f)$ $\sin^{-1}(V_t/V_m)$. The described criterion is applicable to all types of ACLEDs to assure that the triac 452 can be stably triggered in both positive and negative half cycle of the AC power source. Take ACLED with $V_t$ (rms)=80V as an example, and supposing the $V_m$ (rms)=110V and f=60 Hz, then $t_o$=2.2 ms and (½f)=8.3 ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$<6.1 ms.

Figure 3B:
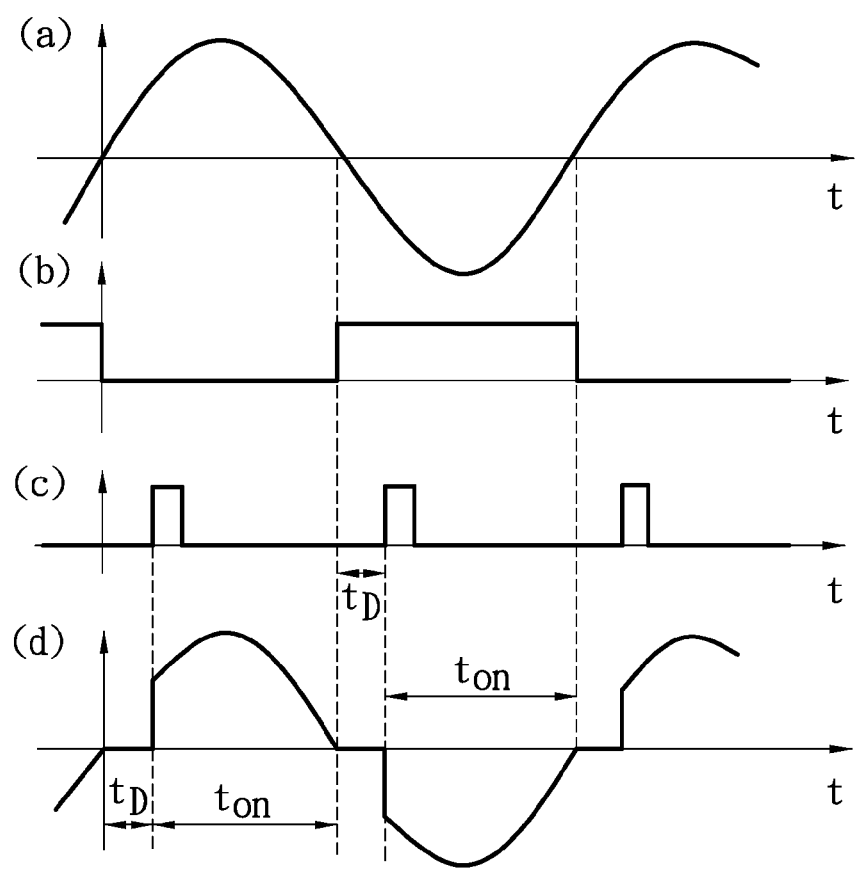
FIG. 3B illustrates a timing waveform of two-level LED security light in accordance to the second exemplary embodiment of the present disclosure.

Refer to FIG. 3B, which illustrates a timing waveform of the two-level LED security light in accordance to the second exemplary embodiment of the present disclosure. Waveforms (a)~(d) of FIG. 3B respectively represent the AC power source, the output of the zero-crossing detection circuit 453, the zero-crossing delay pulse at the control pin of the microcontroller 240, and the voltage waveform across the two ends of the ACLED in the light emitting unit 450. The zero-crossing detection circuit 453 converts the AC voltage sinusoidal waveform associated with the AC power source to a symmetric square waveform having a low and a high voltage levels as shown in FIG. 3B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 3B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 3B(d) illustrates a voltage waveform applied across the two ends associated with the ACLED. The illumination level of the light emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Refer to FIG. 3A and FIG. 3B concurrently for setting ACLED illumination level. In manual setting, the microcontroller 240 with program codes controls the conduction time period $t_{on}$ of the ACLED to be in a preset range 0<$t_{on}$<¼f−$t_0$; wherein by tuning the variable resistor (voltage divider 270a) the light intensity level of the ACLED can be adjusted between zero and 50% of the maximum light intensity. In the free-run setting of illumination level, the microcontroller 240 with program codes controls the conduction time period $t_{on}$ of the ACLED to periodically change in a preset range 0<$t_{on}$<¼f−$t_0$, such that the ACLED generates illumination gradually and periodically increasing from zero to 50% and then decreasing from 50% to zero of the maximum light intensity. When following the free-run of lighting variation, the illumination level can be set through power interruption momentarily by utilizing the power switch 160a.

Refer to FIG. 4, which illustrates a schematic diagram of a two-level LED security light 100 in accordance to the second exemplary embodiment of the present disclosure. The operation of the external control 270' can be referred to FIG. 2C and the related description of manual and free-running setting of illumination level, and the earlier description thus the redundant information is not repeated. It is worth mentioning that the power supply detection circuit 270b is implemented by the zero-crossing detection circuit 554, and the power switch mentioned in the previous embodiment can be implemented by the power switch 160a electrically coupled to the AC power source and the zero-crossing detection circuit 554. The light emitting unit 550 of the lighting apparatus 100 includes an ACLED1, an ACLED2, and a phase controller 551. The phase controller 551 can be treated as two phase controllers 451 (shown in FIG. 3A) which are parallel-connected. In still another embodiment, a plurality of phase controllers (451 or 551) are respectively series-connected to a plurality of alternating current (AC) lighting sources (ACLED), wherein the pairs of phase controller-AC lighting source are parallel-connected to the AC power source. The phase controller 551 includes triacs 552 and 553, the zero-crossing detection circuit 554 as well as resistors R1 and R2. The light emitting unit 550 of FIG. 4 is different from the light emitting unit 450 of FIG. 3A in that the light emitting unit 550 has more than one ACLEDs and more than one bi-directional switching devices. Furthermore, the color temperatures of the ACLED1 and the ACLED2 may be selected to be different.

In the exemplary embodiment of FIG. 4, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the second level illumination as well as illumination of mix color temperature. In the PS mode, the microcontroller 240 uses the phase controller 551 to trigger only the ACLED2 to conduct for a short period, thereby generates the first level illumination as well as illumination of low color temperature. Moreover, in the PS mode, when the motion sensor 230 detects a human motion, the microcontroller 240 may through the phase controller 551 trigger the ACLED1 and the ACLED2 to conduct for a long period. Thereby, it may render the light emitting unit 450 to generate the second level illumination of high color temperature and to produce high contrast in illumination and hue, for a short predetermined duration to warn the intruder. Consequently, the lighting apparatus may generate the first level or the second level illumination of different hue. The rest of operation theories associated with the light emitting unit 550 are essentially the same as the light emitting unit 450 and further descriptions are therefore omitted.

A lighting apparatus may be implemented by integrating a plurality of LEDs with a microcontroller and various types of sensor components in the controlling circuit in accordance to the above described two exemplary embodiments. This lighting apparatus may automatically generate first level illumination when the ambient light detected is insufficient and time-switch to the low level illumination. In addition, when a person is entering the predetermined detection zone, the lighting apparatus may switch from the first level illumination to the second level illumination, to provide the person with sufficient illumination or to generate strong illumination and hue contrast for monitoring the intruder. Further, the illumination characteristic of at least one of the first level illumination and the second level illumination of the light emitting unit can be set through two setting modes, namely, manual and free-running setting, such that the illumination characteristic is set to fulfill user's demand by activating an external control unit.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An LED security light, comprising:
a light emitting unit;
a loading and power control unit;
a photo sensor unit;
a motion sensor unit;
a power supply unit; and
an external control unit, electrically coupled with the loading and power control unit;
wherein the light emitting unit is an LED lamp;
wherein the loading and power control unit comprises a microcontroller electrically coupled with a controllable semiconductor switching device, wherein the controllable semiconductor switching device is electrically connected in series with a power source and with the light emitting unit, wherein the microcontroller outputs a control signal to control conduction rate of the controllable semiconductor switching device for delivering different average electric powers to drive the light emitting unit for generating different illumination modes according to control signals received from the photo sensor unit and the motion sensor unit, wherein when an ambient light detected by the photo sensor unit is lower than a first predetermined value, the motion sensor unit is switched on and the light emitting unit is simultaneously managed by the loading and power control unit to perform a first level illumination mode, wherein when the ambient light detected by the photo sensor unit is higher than a second predetermined value, the light emitting unit and the motion sensor unit are turned off by the loading and power control unit, wherein when a motion intrusion is detected by the motion sensor unit, the loading and power control unit manages to increase the average electric power delivered to the light emitting unit to perform a second level illumination mode for a predetermined duration, and then the light emitting unit is resumed to perform the first level illumination mode, wherein the first level illumination mode and the second level illumination mode are respectively characterized with specific light intensity, wherein the light intensity of the second level illumination mode is always higher than the light intensity of the first level illumination mode, wherein the external control unit is at least usable for adjusting and setting the light intensity of at least one illumination mode.

2. The LED security light according to claim 1, wherein the illumination mode is the first level illumination mode, wherein the external control unit is used for adjusting and setting the light intensity of the first level illumination mode.

3. The LED security light according to claim 1, wherein the illumination mode is the second level illumination mode, wherein the external control unit is used for adjusting and setting the light intensity of the second level illumination mode.

4. The LED security light according to claim 1, wherein the external control unit is further usable for adjusting and setting a time length of the predetermined duration for performing the second level illumination mode.

5. The LED security light according to claim 1, wherein the external control unit comprises at least a push button, a touch panel, an infrared ray sensor or a wireless remote control device electrically coupled to at least a pin of the microcontroller of the loading and power control unit; wherein when the push button, the touch panel, the infrared ray sensor or the wireless remote control device is operated, a voltage signal readable and interpretable to the microcontroller is thereby generated to trigger the microcontroller to activate a corresponding subroutine designed for adjusting and setting the light intensity of at least one of the first level illumination mode or the second level illumination mode.

6. The LED security light according to claim 5, wherein the wireless remote control device is a Wi-Fi wireless control signal receiver, a Blue Tooth wireless control signal receiver or a RF (radio frequency) wireless control signal receiver.

7. The LED security light according to claim 6, wherein the first level illumination mode can be preset at zero.

8. The LED security light according to claim 1, wherein the external control unit is a push button, a touch panel, an infrared ray sensor or a wireless remote control device; wherein when the push button, the touch panel, the infrared ray sensor or the wireless remote control device is activated, at least one of a first voltage signal with a binary format or a second voltage signal with a binary format readable and interpretable to the microcontroller is generated to trigger the microcontroller to activate at least one of a first subroutine or a second subroutine, wherein the first subroutine is designed for adjusting and setting the light intensity of the first level illumination mode or the second level illumination mode, wherein the second subroutine is designed for adjusting and setting a time length of the predetermined duration for performing the second level illumination mode.

9. The LED security light according to claim 8, wherein the wireless remote control device is a Wi-Fi wireless control signal receiver, a Blue Tooth wireless control signal receiver or a RF (radio frequency) wireless control signal receiver.

10. The LED security light according to claim 9, wherein the light intensity of the first level illumination mode can be preset at zero.

11. The LED security light according to claim 9, wherein the microcontroller comprises a memory for saving or installing an application program (APP) or a software program, wherein the application program (APP) from an internet or a cloud server is downloaded for updating the memory of the microcontroller.

12. The LED security light according to claim 1, wherein the external control unit comprises at least one voltage divider; wherein the voltage divider comprises a variable resister, wherein the voltage divider is electrically connected to a pin of the microcontroller, wherein when the voltage divider is operated, a DC voltage is selected and generated by tuning the variable resister to trigger the microcontroller to activate a corresponding subroutine designed for adjusting and setting the light intensity of at least one of the first level illumination mode or the second level illumination mode.

13. The LED security light according to claim 1, wherein the power supply unit is an AC/DC power converter to convert an AC power source into DC power required for operating the LED security light, wherein the power source is a DC power from the power supply unit; wherein the controllable semiconductor switching device is a unidirectional semiconductor switching device, wherein the microcontroller outputs a PWM (pulse width modulation) signal to control a conduction period ($T_{on}$) and a cutoff period ($T_{off}$) of the controllable semiconductor switching device for delivering different average currents from the power supply unit to drive the light emitting unit for generating different illumination modes, wherein the microcontroller controls the controllable semiconductor switching device respectively to have a short conduction period ($T_{on}$) and a long conduction period ($T_{on}$) such that the light emitting unit respectively generated a first level illumination mode and a second level illumination mode characterized by different light intensity according to the signals received from the photo sensor unit and the motion sensor unit.

14. The LED security light according to claim 1, wherein the power supply unit is a battery module to output DC power for operating the LED security light, wherein the power source is a DC power, wherein the controllable semiconductor switching device is a unidirectional semiconductor switching device, wherein the microcontroller outputs a PWM (pulse width modulation) signal to control a conduction period ($T_{on}$) and a cutoff period ($T_{off}$) of the controllable semiconductor switching device for delivering different average electric currents from the power supply unit to drive the light emitting unit for generating different illumination modes, wherein the microcontroller controls the unidirectional semiconductor switching device respectively to have a short conduction period ($T_{on}$) and a long conduction period ($T_{on}$) such that the light emitting unit respectively generate a first level illumination mode and a second level illumination mode characterized by different light intensity according to signals received from the photo sensor unit and the motion sensor unit.

15. The LED security light according to claim 14, wherein the battery module is a solar battery module comprising a solar panel circuitry for charging the solar battery.

16. The LED security light according to claim 1, wherein the power supply unit is an AC/DC power converter to convert an AC power source into DC power for operating the LED security light, wherein the power source is the AC power source, wherein the light emitting unit is a LED lamp adaptable to the AC power source, wherein the controllable semiconductor switching device is a phase controller comprising a bidirectional semiconductor switching device, wherein a zero-crossing detection circuit is electrically coupled to the microcontroller, wherein the bidirectional semiconductor switching device is connected in series between the AC power source and the LED lamp, wherein the microcontroller incorporating with the zero-crossing detection circuit outputs a time delay pulse lagging behind the zero-crossing point in each half cycle of the AC power source to control the conduction rate of the phase controller for delivering different average AC power to drive the LED lamp for generating different illumination modes according to control signals received from the photo sensor unit and the motion sensor unit.

17. The LED security light according to claim 16, wherein the LED lamp is a DC LED module bridging one port to a full wave rectifier to receive AC power delivered by the power supply unit controlled by the loading and power control unit.

18. The LED security light according to claim 16, wherein the LED lamp is an AC LED module comprising two polarity reverse LED arrays connected in parallel, wherein the first LED array conducts a positive half cycle of the AC power controlled by the loading and power control unit while the second LED array conducts a negative half cycle of the AC power controlled by the loading and power control unit.

19. The LED security light according to claim 16, wherein in order to ensure a successful conduction, the phase controller is confined to operate in a dimmable phase time domain between $t_0$ and $1/(2f)-t_0$, wherein f is the frequency of the AC power source and $t_0$ is a corresponding phase time of a cut-in voltage at which the LED lamp starts to emit light.

20. An LED security light, comprising:
a light emitting unit;
a loading and power control unit;
a photo sensor unit;
a motion sensor unit;
a power supply unit; and
an external control unit, electrically coupled with the loading and power control unit;
wherein the light emitting unit is an LED lamp, wherein the loading and power control unit comprises a microcontroller, wherein the microcontroller is electrically coupled to a controllable semiconductor switching device, wherein the controllable semiconductor switching device is electrically connected in series with a power source and with the light emitting unit, wherein the microcontroller outputs a control signal to control conduction rate of the controllable semiconductor switching device for delivering different average electric powers to drive the light emitting unit for generating different illumination modes according to control signals received from the photo sensor unit or motion sensor unit;
wherein when an ambient light detected by the photo sensor unit is lower than a first predetermined value, the light emitting unit is thereby turned on by the loading and power control unit to perform a first level illumination mode for a first predetermined duration, then the light emitting unit is switched to perform a second level illumination mode, wherein when the ambient light detected by the photo sensor unit is higher than a second predetermined value, the light emitting unit is thereby turned off by the loading and power control unit, wherein when a motion intrusion is detected by the motion sensor unit, the loading and power control unit manages to increase the average electric power delivered to the light emitting unit to generate a high level illumination mode for a second predetermined duration, wherein the first level illumination mode, the second level illumination mode and the high level illumination mode are respectively characterized with specific light intensity, wherein the light intensity of the high level illumination mode is always higher than the light intensity of the second level illumination mode; wherein the external control unit is at least usable for adjusting and setting the light intensity for at least one of the first level illumination mode, the second level illumination mode or the high level illumination mode.

21. The LED security light according to claim 20, wherein the external control unit is further usable for adjusting and setting a time length of the first predetermined duration for performing the first level illumination mode.

22. The LED security light according claim 20, wherein the external control unit is further usable for adjusting and setting a time length of the second predetermined duration for performing the high level illumination mode.

23. The LED security light according to claim 20, wherein the external control unit is further usable for alternately performing between a motion sensor controlled illumination mode and an adjustable timer controlled illumination mode, wherein when the LED security light is in the adjustable timer controlled illumination mode, the motion sensor unit is disabled temporarily till at the time when a time period preset by the adjustable timer expires or till at a clock time point selected by the adjustable timer and the motion sensor unit is then enabled; the external control unit is further usable for adjusting and setting the light intensity of the adjustable timer controlled illumination mode, the external control unit is additionally usable for adjusting and setting a time length or the clock time point for performing the adjustable timer controlled illumination mode; wherein when the LED security light is in the motion sensor controlled illumination mode, the external control unit is further usable for adjusting and setting the light intensity of at least one of the first level illumination mode, the second level illumination mode and the high level illumination mode, the external control unit is also usable for adjusting and setting the time length of at least one of the first predetermined duration for performing the first level illumination mode or the second predetermined duration for performing the high level illumination mode.

24. The LED security light according to claim 20, wherein the external control unit is at least a push button, a touch panel, an infrared ray sensor, or a wireless remote control device coupled to at least one pin of the microcontroller of the loading and power control unit; wherein when the push button, the touch panel, the infrared ray sensor or a wireless remote control device is operated, a voltage signal readable and interpretable to the microcontroller is thereby generated to trigger the microcontroller to activate a first corresponding subroutine designed for adjusting and setting the light intensity of at least one of the first level illumination mode, the second level illumination mode or the high level illumination mode; or the microcontroller to activate a second corresponding subroutine designed for adjusting and setting a time length of at least one of the first predetermined duration for performing the first level illumination mode or the second predetermined duration for performing the high level illumination mode.

25. The LED security light according to claim 24, wherein the wireless remote control device is a Wi-Fi wireless control signal receiver, a Blue Tooth wireless control signal receiver or a RF (radio frequency) wireless control signal receiver.

26. The LED security light according to claim 25, wherein the light intensity of the second level illumination mode can be preset at zero.

27. The LED security light according to claim 25, wherein the microcontroller comprises a memory for saving or installing an application (APP) or a software program, wherein the application program or software program from an internet or a cloud server is downloaded to update the memory.

28. The LED security light according to claim 20, wherein the external control unit comprises at least one voltage divider, wherein the voltage divider comprises a variable resister, wherein the voltage divider is electrically connected to a pin of the microcontroller, wherein when the voltage divider is operated, a DC voltage is selected and generated by tuning the variable resister to trigger the microcontroller to activate a corresponding subroutine designed for adjusting and setting a time length of at least one of the first predetermined duration or the second predetermined duration.

29. The LED security light according to claim 28, wherein the light intensity of the second level illumination mode can be preset at zero.

30. The LED security light according to claim 20, wherein the external control unit comprises a power supply detecting circuit connectable to a power switch and at least two voltage dividers; wherein the power switch is a rocker switch connected to an AC power source to control power on and power off; wherein when instantly turning the power switch off and turning the power switch back on in a short preset time interval, the electric power interruption is detected by the microcontroller through the power supply detecting circuit, the microcontroller thereby manages to switch alternately between performing a motion sensor controlled illumination mode and performing a photo sensor controlled dusk to dawn illumination mode; wherein the first voltage divider is a dimmer circuitry comprising a first variable resister, wherein the second voltage divider is a time setting unit comprising a second variable resister, wherein the first voltage divider is electrically connected to one pin of the microcontroller, wherein the second voltage divider is electrically connected to another pin of the microcontroller, wherein when the first voltage divider is operated, a first DC voltage is selected and generated by tuning the first variable resister to trigger the microcontroller to activate a first corresponding subroutine designed for setting the light intensity for at least one of the first level illumination mode, the second level illumination mode and the high level illumination mode; wherein when the second voltage divider is operated, a second DC voltage is selected and generated by tuning the second variable resister to trigger the microcontroller to activate a second corresponding subroutine for setting a time length of at least the first predetermined duration for performing the first level illumination mode or the second predetermined duration for performing the high level illumination mode.

31. The LED security light according to claim 30, wherein the light intensity of the second level illumination mode can be preset at zero.

32. The LED security light according to claim 20, wherein the power supply unit is an AC/DC power converter to convert an AC power source into DC power required for operating the LED security light, wherein the power source is an AC power source, wherein the light emitting unit is an LED lamp adaptable to the AC power source, wherein the controllable semiconductor switching device is a phase controller comprising a bidirectional semiconductor switching device, wherein a zero-crossing detection circuit is electrically coupled to the microcontroller, wherein the phase controller is connected in series between the AC power source and the LED lamp, wherein the microcontroller incorporating with the zero-crossing detection circuit outputs a time delay pulse lagging behind the zero-crossing point in each half cycle of the AC power source to control the conduction rate of the phase controller for delivering different average AC power to drive the LED lamp for generating different illumination modes according to the control signals received from the photo sensor unit and the motion sensor unit.

33. The LED security light according to claim 32, wherein the LED lamp is a DC LED module bridging one port to a full wave rectifier to receive AC power delivered by the power supply unit controlled by the loading and power control unit.

34. The LED security light according to claim 32, wherein the LED lamp is an AC LED module comprising two polarity reverse LED arrays connected in parallel, wherein the first LED array conducts a positive half cycle of the AC power controlled by the loading and power control unit while the second LED array conducts a negative half cycle of the AC power controlled by the loading and power control unit.

35. The LED security light according to claim 32, wherein in order to ensure a successful conduction, the phase controller is confined to operate in a dimmable phase time domain between $t_0$ and $1/(2f)-t_0$, wherein f is the frequency of AC power source and $t_0$ is a corresponding phase time of a cut-in voltage at which the LED lamp starts to emitting light.

36. The LED security light according to claim 20, wherein the power supply unit is an AC/DC power converter to convert an AC power source into DC power power required for operating the LED security light, wherein the power source is a DC power from the power supply unit; wherein the controllable semiconductor switching device is a unidirectional semiconductor switching device, wherein the microcontroller outputs a PWM (pulse width modulation) signal to control a conduction period ($T_{on}$) and a cutoff period ($T_{off}$) of the controllable semiconductor switching device for delivering different average currents from the power supply unit to drive the light emitting unit for generating different illumination modes characterized by different light intensity according to the signals received from the photo sensor unit and the motion sensor unit.

37. The LED security light according to claim 20, wherein the power supply unit is a battery module to output DC power for operating the LED security light, wherein the power source is a DC power, wherein the controllable semiconductor switching device is a unidirectional semiconductor switching device, wherein the microcontroller outputs a PWM (pulse width modulation) signal to control a conduction period ($T_{on}$) and a cutoff period ($T_{off}$) of the controllable semiconductor switching device for delivering different average electric currents from the power supply unit to drive the light emitting unit for generating different illumination modes characterized by different light intensity according to signals received from the photo sensor unit and the motion sensor unit.

38. The LED security light according to claim 37, wherein the battery module is a solar battery module comprising a solar panel circuitry for charging the solar battery.

39. An LED security light control device, comprising:
a loading and power control unit;
a photo sensor unit;
a power supply unit; and
an external control unit, electrically coupled with the loading and power control unit;
wherein the LED security light control device is connectable to an LED lamp, wherein the loading and power control unit comprises a microcontroller, wherein the microcontroller is electrically coupled to a controllable semiconductor switching device, wherein the controllable semiconductor switching device is electrically connectable in series with a power source and with the LED lamp, wherein the microcontroller outputs a control signal to control conduction rate of the controllable semiconductor switching device for delivering different average electric power to drive the LED lamp for generating different illumination modes according to control signals received from the photo sensor unit;
wherein when an ambient light detected by the photo sensor unit is lower than a first predetermined value, the LED lamp is thereby turned on by the loading and power control unit to generate a first level illumination mode for a first predetermined duration, then the LED lamp is switched to a second level illumination mode, wherein when the ambient light detected by the photo sensor unit is higher than a second predetermined value, the LED lamp is thereby turned off by the loading and power control unit;
wherein the external control unit is at least usable for adjusting and setting a light intensity for at least the second level illumination mode.

40. The LED security light control device according claim 39, wherein the external control unit is further usable for adjusting and setting a time length of at least the first predetermined duration for performing the first level illumination mode.

41. The LED security light control device according to claim 39, wherein the external control unit comprises at least a push button, a touch panel, an infrared ray sensor or a wireless remote control device electrically coupled to a pin of the microcontroller, wherein when the push button, the touch panel, the infrared ray sensor or the wireless remote control device is operated, a voltage signal readable and interpretable to the microcontroller is thereby generated to trigger the microcontroller to activate a corresponding subroutine; wherein the corresponding subroutine is designed for adjusting and setting at least the light intensity of the second level illumination mode, or for adjusting and setting a time length of at least the first predetermined duration for performing the first level illumination mode.

42. The LED security light control device according to claim 41, wherein the wireless remote control device is a Wi-Fi wireless control signal receiver, a Blue Tooth wireless control signal receiver or a RF (radio frequency) wireless control signal receiver.

43. The LED security light control device according to claim 42, wherein the microcontroller has a memory for saving or installing an application program (APP) or an application software, wherein the application program or application software from an internet or a cloud server is downloaded to update the memory of the microcontroller.

44. The LED security light control device according to claim 39, wherein the external control unit comprises at least one voltage divider, wherein the voltage divider comprises a variable resister, wherein the voltage divider is electrically connected to a pin of the microcontroller, wherein when the voltage divider is operated, a DC voltage is selected and generated by tuning the variable resister to trigger the microcontroller to activate a subroutine designed for setting at least the light intensity of the second level illumination mode or to activate a subroutine designed for adjusting and setting at least a time length of the first predetermined duration for performing the first level illumination mode.

45. The LED security light control device according to claim 39, wherein the power supply unit is an AC/DC power converter to convert an AC power source into DC power for operating the LED security light, wherein the power source is the AC power source, wherein the light emitting unit is an LED lamp adaptable to the AC power source, wherein the controllable semiconductor switching device is a phase controller comprising a bidirectional semiconductor switching device, wherein a zero-crossing detection circuit is electrically coupled to the microcontroller, wherein the bidirectional semiconductor switching device is connected in series between the AC power source and the LED lamp, wherein the microcontroller incorporating with the zero-crossing detection circuit outputs a time delay pulse lagging behind the zero-crossing point in each half cycle of the AC power source to control the conduction rate of the phase controller for delivering different average AC power to drive the LED lamp for generating different illumination modes according to control signals received from the photo sensor unit.

46. The LED security light control device according to claim 45, wherein the LED lamp is a DC LED module bridging one port to a full wave rectifier to receive AC power delivered by the power supply unit controlled by the loading and power control unit.

47. The LED security light control device according to claim 45, wherein the LED lamp is an AC LED module comprising two polarity reverse LED arrays connected in parallel, wherein the first LED array conducts a positive half cycle of the AC power controlled by the loading and power control unit while the second LED array conducts a negative half cycle of the AC power controlled by the loading and power control unit.

48. The LED security light control device according to 45, wherein in order to ensure a successful conduction, the phase controller is confined to operate in a dimmable phase time domain between $t_0$ and $1/(2f)-t_0$, wherein f is the frequency of the AC power source and $t_0$ is a corresponding phase time of a cut-in voltage at which the LED lamp starts to emit light.

49. An LED security light control device, comprising:
a loading and power control unit;
a photo sensor unit;
a motion sensor unit;
a power supply unit; and
an external control unit;
wherein the LED security light control device is electrically connectable to an LED lamp, wherein the loading and power control unit comprises a microcontroller, wherein the microcontroller is electrically coupled to a controllable semiconductor switching device, wherein the controllable semiconductor switching device is electrically connectable in series between a power source and the LED lamp, wherein the microcontroller outputs a control signal to control conduction rate of the controllable semiconductor switching device for delivering different electric powers to drive the LED lamp for generating different illumination modes according to control signals received from the photo sensor unit and the motion sensor unit;
wherein when an ambient light detected by the photo sensor unit is lower than a first predetermined value, the motion sensor unit is switched on and the LED lamp is managed by the loading and power control unit for performing a first level illumination mode for a first predetermined duration, then the LED lamp is switched to a second level illumination mode, wherein when the ambient light detected by the photo sensor unit is higher than a second predetermined value, the motion sensor unit and the LED lamp are thereby switched off by the loading and power control unit, wherein when a motion intrusion is detected by the motion sensor unit, the loading and power control unit manages to increase the average electric power delivered to the LED lamp to generate a high level illumination mode for a second predetermined duration, and then the LED lamp is resumed to the second level illumination mode, wherein the first level illumination mode, the second level illumination mode and the high level illumination mode are characterized with different light intensity wherein the light intensity of the high level illumination mode is higher than the light intensity of the second level illumination mode; wherein the external control unit is at least usable for adjusting and setting at least the light intensity of at least one of the first level illumination mode, the second level illumination mode and the high level illumination mode.

50. The LED security light control device according to claim 49, wherein the external control unit is further usable for adjusting and setting at least a time length of at least the first predetermined duration for performing the first level illumination mode or the second predetermined duration for the high level illumination mode.

51. The LED security light control device according to claim 49, wherein the external control unit comprises at least a push button, a touch panel, an infrared ray sensor or a wireless remote control device electrically coupled to at least a pin of the microcontroller; wherein when the push button, the touch panel, the infrared ray sensor or the wireless remote control device is operated, a first voltage signal readable and interpretable to the microcontroller is selected and generated to trigger the microcontroller to activate a first corresponding subroutine designed for adjusting and setting at least the light intensity of at least one of the first level illumination mode, the second level illumination mode and the high level illumination mode; wherein a second voltage signal readable and interpretable to the microcontroller can be further selected and generated to activate a second corresponding subroutine for adjusting and setting a time length of at least one of the first predetermined duration for performing the first level illumination mode or the second predetermined duration for performing the high level illumination mode.

52. The LED security light control device according to claim 51, wherein the wireless remote control device is a Wi-Fi wireless control signal receiver, a Blue Tooth wireless control signal receiver or a RF (radio frequency) wireless control signal receiver.

53. The LED security light control device according to claim 51, wherein the light intensity of the second level illumination mode can be preset at zero.

54. The LED security light control device according to claim 52, wherein the microcontroller has a memory for saving or installing an application program (APP) or application software, wherein the application program (APP) or application software from an internet or cloud server is downloaded to update the memory of the microcontroller.

55. The LED security light control device according to claim 49, wherein the external control unit comprises at least one voltage divider, wherein the voltage divider comprise a variable resister, wherein the voltage divider is electrically connected to a pin of the microcontroller, wherein when the voltage divider is operated, a DC voltage is selected and generated by tuning the variable resister to trigger the microcontroller to activate a first corresponding subroutine designed for adjusting and setting the light intensity for at least one of the first level illumination mode, the second level illumination mode or the high level illumination mode; or to activate a second corresponding subroutine designed for adjusting and setting at least a time length of the first predetermined duration for performing the first level illumination mode or the second predetermined duration for performing the high level illumination mode.

56. The LED security light according to claim 55, wherein the light intensity of the second level illumination mode can be preset at zero.

57. The LED security light control device according to claim 49, wherein the power supply unit is an AC/DC power converter to convert an AC power source into DC power for operating the LED security light, wherein the power source is the AC power source, wherein the light emitting unit is an LED lamp adaptable to the AC power source, wherein the controllable semiconductor switching device is a phase controller comprising a bidirectional semiconductor switching device, wherein a zero-crossing detection circuit is electrically coupled to the microcontroller, wherein the bidirectional semiconductor switching device is connected in series between the AC power source and the LED lamp, wherein the microcontroller incorporating with the zero-crossing detection circuit outputs a time delay pulse lagging behind the zero-crossing point in each half cycle of the AC power source to control the conduction rate of the phase controller for delivering different average AC power to drive the LED lamp for generating different illumination modes according to control signals received from the photo sensor unit and the motion sensor unit.

58. The LED security light control device according to claim 57, wherein the LED lamp is a DC LED module bridging one port to a full wave rectifier to receive AC power delivered by the power supply unit controlled by the loading and power control unit.

59. The LED security light control device according to claim 57, wherein the LED lamp is an AC LED module comprising two polarity reverse LED arrays connected in parallel, wherein the first LED array conducts a positive half cycle of the AC power controlled by the loading and power control unit while the second LED array conducts a negative half cycle of the AC power controlled by the loading and power control unit.

60. The LED security light control device according to claim 57, wherein in order to ensure a successful conduction, the phase controller is confined to operate in a dimmable phase time domain between $t_0$ and $1/(2f)-t_0$, wherein f is the frequency of the AC power source and $t_0$ is a corresponding phase time of a cut-in voltage at which the LED lamp starts to emit light.

61. The LED security light control device according to claim 49, wherein the power supply unit is a battery module to output DC power to operate the LED security light control device, wherein the power source is DC power from the battery module.

62. The LED security light control device according to claim 61, wherein the battery module is a solar battery module comprising a solar panel and a circuitry for charging the solar battery.

* * * * *

UNITED STATES PATENT AND TRADEMARK OFFICE
CERTIFICATE OF CORRECTION

PATENT NO. : 9,560,719 B2
APPLICATION NO. : 15/072602
DATED : January 31, 2017
INVENTOR(S) : Chia-Teh Chen Page 1 of 2

It is certified that error appears in the above-identified patent and that said Letters Patent is hereby corrected as shown below:

In the Claims

Claim 1, Column 15, Lines 21-22 should read:
according to signals received from the photo sensor unit and the motion sensor unit Claim 13, Column 17, Lines 1-2 should read:
respectively generates the first level illumination mode and the second level illumination mode Claim 14, Column 17, Lines 21-22 should read:
respectively generates the first level illumination mode and the second level illumination mode Claim 16, Column 17, Lines 45-47 should read:
according to signals received from the photo sensor unit and the motion sensor unit Claim 20, Column 18, Lines 20-22 should read:
according to signals received from the photo sensor unit or the motion sensor unit Claim 32, Column 20, Lines 48-50 should read:
according to signals received from the photo sensor unit and the motion sensor unit Claim 36, Column 21, Line 6 should read:
convert an AC power source into DC power Claim 39, Column 21, Lines 53-54 should read:
according to signals received from the photo sensor unit Claim 45, Column 22, Lines 46-48 should read:
wherein the power source is the AC power source, wherein a light emitting unit is the LED lamp adaptable to the AC power source Signed and Sealed this
Sixth Day of October, 2020

Andrei Iancu
*Director of the United States Patent and Trademark Office*

CERTIFICATE OF CORRECTION (continued)
U.S. Pat. No. 9,560,719 B2

Claim 45, Column 22, Lines 61-62 should read:
according to signals received from the photo sensor unit Claim 49, Column 23, Lines 35-36 should read:
according to signals received from the photo sensor unit and the motion sensor unit Claim 56, Column 24, Line 53 should read:
The LED security light control device according to claim 55

Claim 57, Column 24, Lines 60-61 should read:
wherein a light emitting unit is the LED lamp adaptable to the AC power source Claim 57, Column 25, Lines 7-8 should read:
according to signals received from the photo sensor unit and the motion sensor unit Claim 61, Column 26, Lines 13-14 should read:
wherein the power source is a DC power from the battery module